United States Patent
Shu

(10) Patent No.: US 8,608,438 B2
(45) Date of Patent: Dec. 17, 2013

(54) MOUNTING DEVICE FOR FAN AND FAN MODULE WITH THE SAME

(75) Inventor: Si-Wen Shu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 498 days.

(21) Appl. No.: 12/981,558

(22) Filed: Dec. 30, 2010

(65) Prior Publication Data

US 2012/0156030 A1 Jun. 21, 2012

(30) Foreign Application Priority Data

Dec. 20, 2010 (CN) .......................... 2010 1 0596749

(51) Int. Cl.
*F04D 29/60* (2006.01)

(52) U.S. Cl.
USPC ...................... 415/213.1; 415/214.1; 415/220

(58) Field of Classification Search
USPC ......... 415/213.1, 214.1, 220, 198.1; 417/238; 361/695, 696
See application file for complete search history.

(56) References Cited

U.S. PATENT DOCUMENTS 5,788,566 A * 8/1998 McAnally et al. ............ 454/184

* cited by examiner

*Primary Examiner* — Edward Look
*Assistant Examiner* — Maxime Adjagbe
(74) *Attorney, Agent, or Firm* — Altis Law Group, Inc.

(57) ABSTRACT

A mounting device for a fan includes a first mounting frame and a second mounting frame adjustably mounted to the first mounting frame according to the height of a fan, to sandwich the fan between the first and second mounting frames.

10 Claims, 4 Drawing Sheets

MOUNTING DEVICE FOR FAN AND FAN MODULE WITH THE SAME

BACKGROUND

1. Technical Field

The present disclosure relates to a fan module with a mounting device for a fan.

2. Description of Related Art

With the continuing development of electronic technology, electronic devices, such as computers, generate more heat during operation than previously. The heat needs to be dissipated as quickly as possible. A common method for dissipating the heat is to use a fan to generate airflow to dissipate heat from a computer. Usually, the fan is fixed in a mounting device to form a fan module to be installed in the computer. However, different heights of fans require different mounting devices, with no single mounting device adaptable to such variations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
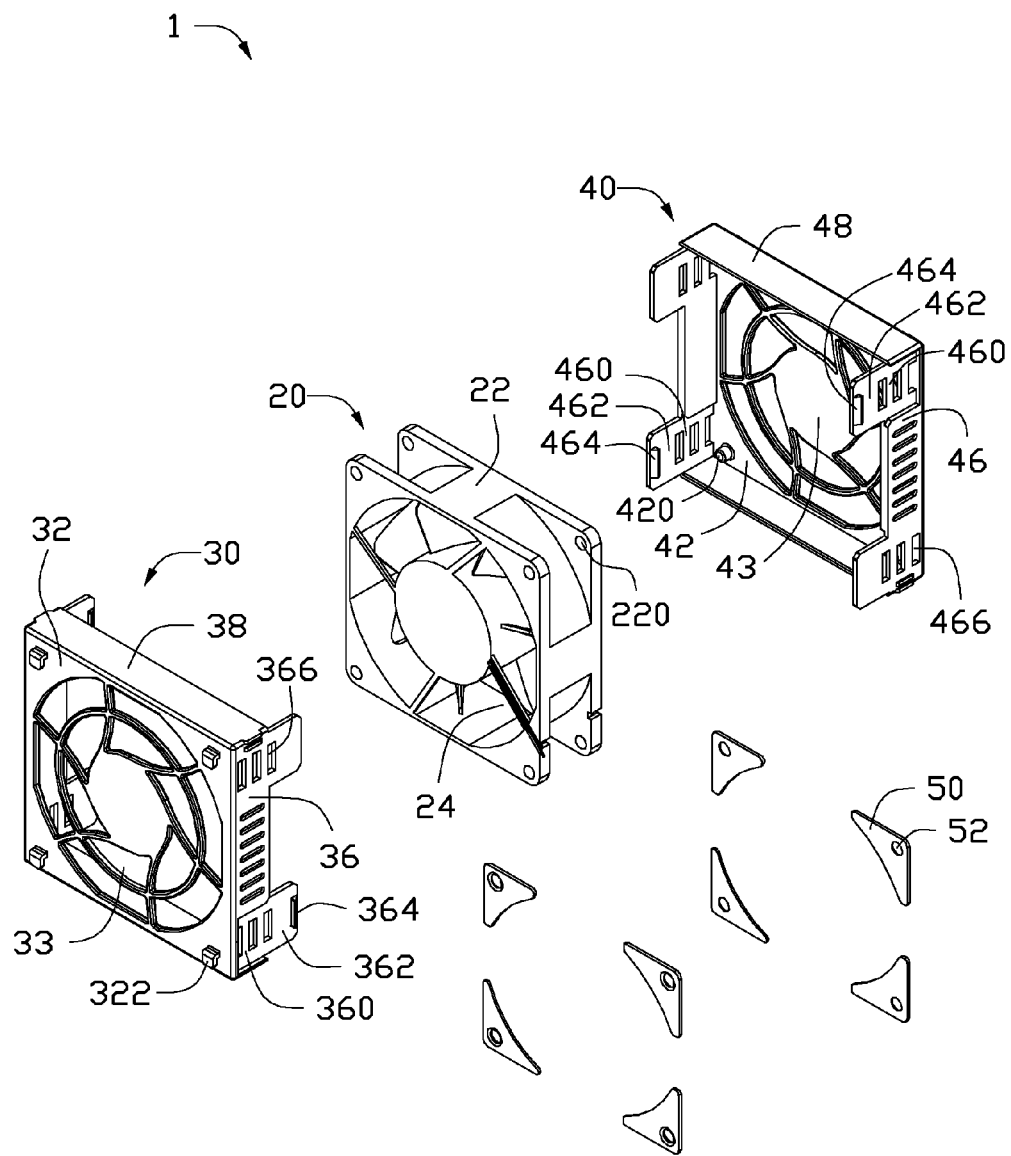
FIG. 1 is an exploded, isometric view of an exemplary embodiment of a fan module.
Figure 2:
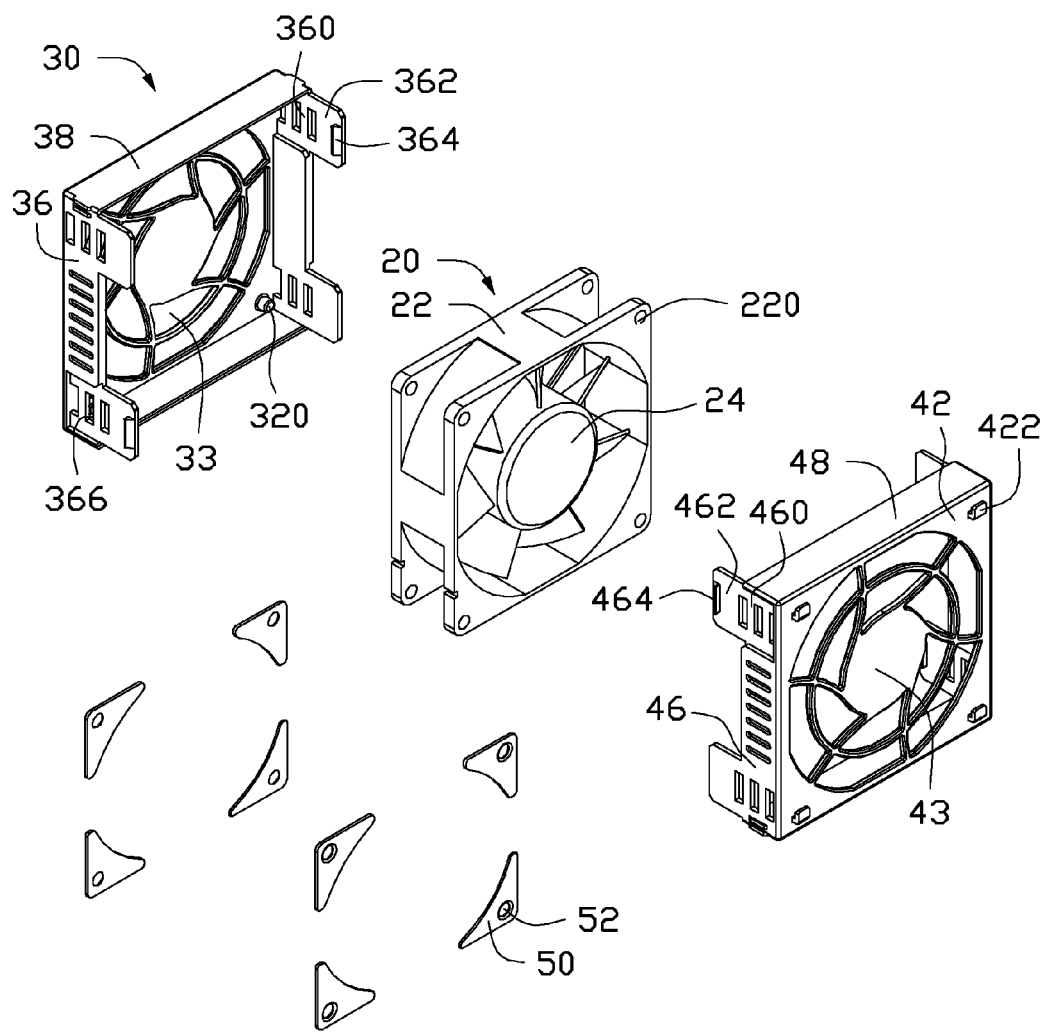
FIG. 2 is similar to FIG. 1, but viewed from another perspective.
Figure 4:
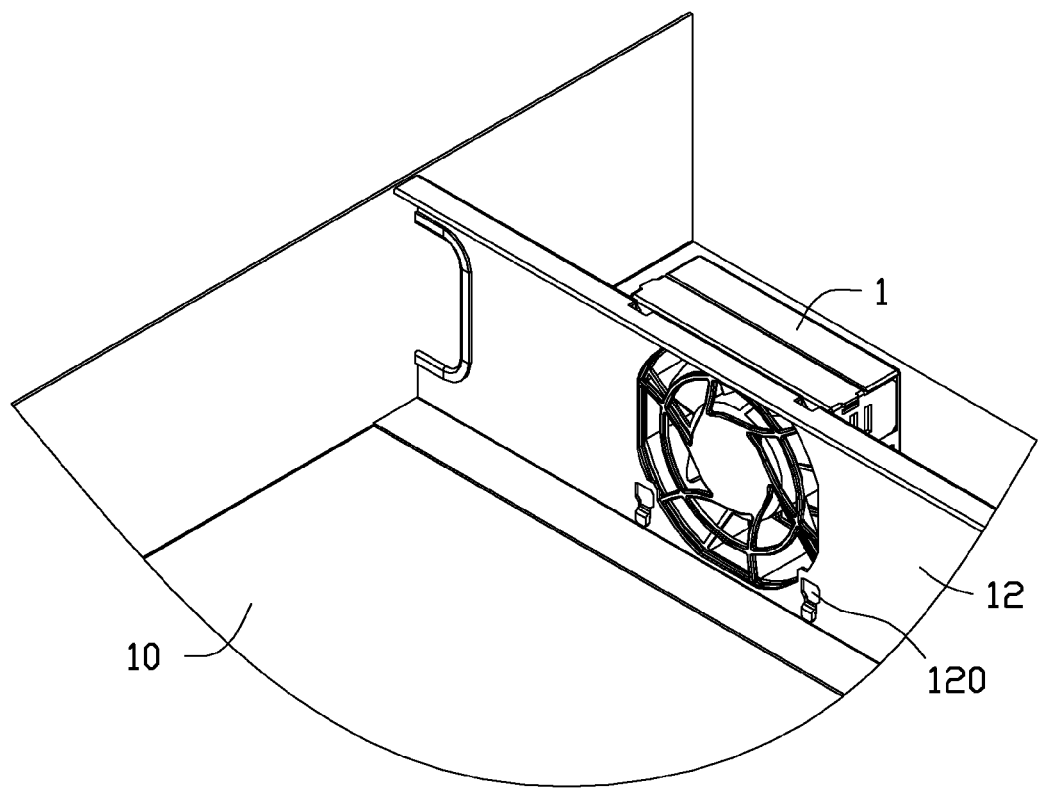
FIG. 4 is an isometric view showing the fan module of FIG. 3 in use.

Referring to FIGS. 1 and 2, a fan module 1 is provided to dissipate heat from an electronic device (shown in FIG. 4). An exemplary embodiment of the fan module 1 includes a fan 20, a first mounting frame 30, a second mounting frame 40, and a plurality of elastic pads 50.

The fan 20 includes a shell 22 and a plurality of blades 24 mounted in the shell 22. Four corners of a first side of the shell 22 and four corners of a second side of the shell 22 opposite to the first side each define a mounting hole 220.

The first mounting frame 30 includes a substantially rectangular base plate 32, two first lateral plates 36 extending from two first opposite sides of the base plate 32, and two second lateral plates 38 extending from two second opposite sides of the base plate 32. The base plate 32 defines a vent portion 33. Four mounting posts 320 extend from four corners of an inner surface of the base plate 32. Four latching portions 322 extend from four corners of an outer surface of the base plate 32. Each first lateral plate 36 defines two receiving spaces 360 respectively in an inner side at a first end of the first lateral plate 36 and in an outer side at a second end of the first lateral plate 36. Two tabs 362 extend from the first and second ends of each first lateral plate 36. A substantially wedge-shaped protrusion 364 extends from each tab 362. The protrusions 364 are respectively positioned at an inner side of the tab 362 at the first end and an outer side of the tab 362 at the second end of the corresponding first lateral plate 36. The first and second ends of each first lateral plate 36 each define a row of latching slots 366. The row of latching slots 366 are arranged perpendicular to the base plate, and each latching slot 366 is parallel to the base plate 32.

The second mounting frame 40 is similar to the first mounting frame 30 and includes a substantially rectangular base plate 42, two first lateral plates 46, and two second lateral plates 48. The base plate 42 defines a vent portion 43. Four mounting posts 420 extend from four corners of an inner surface of the base plate 42. Four latching portions 422 extend from four corners of an outer surface of the base plate 42. Each first lateral plate 46 defines two receiving spaces 460 respectively in an outer side at a first end of the first lateral plate 46 and in an inner side at a second end of the first lateral plate 46. Two tabs 462 extend from the first and second ends of each first lateral plate 46. A substantially wedge-shaped protrusion 464 extends from each tab 462. The protrusions 464 are respectively positioned at an outer side of the tab 462 at the first end and an inner side of the tab 462 at the second end of the corresponding first lateral plate 46. The first and second ends of each first lateral plate 46 each define a row of latching slots 466. The row of latching slots 466 are arranged perpendicular to the base plate 42, and each latching slot 466 is parallel to the base plate 42.

In this embodiment, eight elastic pads 50 are deployed. Each elastic pad 50 is triangular and plastic material. Each elastic pad 50 defines a through hole 52.

Figure 3:
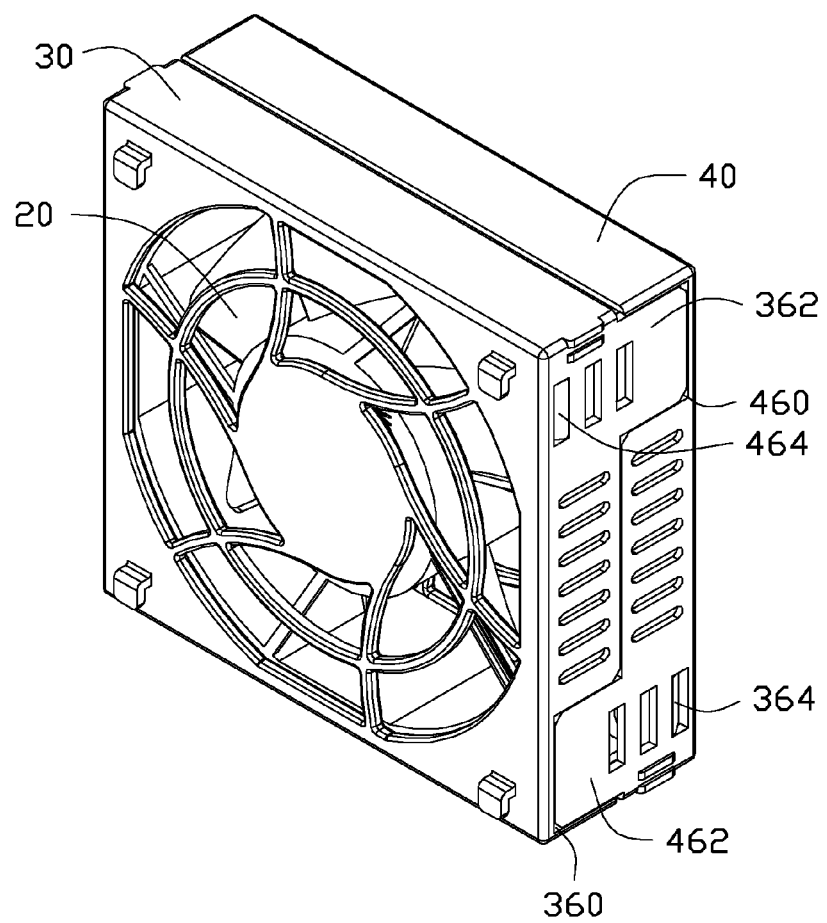
FIG. 3 is an assembled, isometric view of FIG. 1.

Referring to FIG. 3, in assembly, the mounting posts 320 of the first mounting frame 30 extend through the through holes 52 of four elastic pads 50, and the four elastic pads 50 are fixed on the four corners of the base plate 32. The mounting posts 420 of the second mounting frame 40 extend through the through holes 52 of the other four elastic pads 50, and the other four elastic pads 50 are fixed on the four corners of the base plate 42. The first side of the shell 22 resists the elastic pads 50 mounted in the first mounting frame 30, and the mounting posts 320 of the first mounting frame 30 are received in the mounting holes 220 of the first side of the shell 22. The fan 20 is thus seated in the first mounting frame 30.

The tabs 462 of the first lateral plates 40 correspondingly extend through the receiving spaces 360 of the first lateral plates 30, and the tabs 362 of the first lateral plates 30 correspondingly extend through the receiving spaces 460 of the second lateral plates 40. According to the height of the fan 20, the second mounting frame 40 is moved towards the first mounting fame 30, such that the mounting posts 420 of the second mounting frame 40 are received in the mounting holes 220 of the second side of the shell 22, and the second side of the shell 22 resists the elastic pads 50 mounted in the second mounting frame 40. The protrusions 364 of the first mounting frame 30 are latched in the corresponding latching slots 466 of the second mounting frame 40, and the protrusions 464 of the second mounting frame 40 are latched to the corresponding latching slots 366 of the first mounting frame 30. Therefore, the fan 20 is tightly fastened between the first and second frames 30 and 40.

In this embodiment, the elastic pads 50 firmly press the first and second sides of the fan 20. If the fan 20 is subjected to external shock, the elastic pads 50 assist in absorbing the shock.

Referring to FIG. 4, in use, the fan module 1 is fastened in an enclosure 10 of the electronic device. The enclosure 10 includes a mounting plate 12. The mounting plate 12 defines a plurality of latching holes 120, in which the latching portions 322 or 422 are latched to fasten the fan module 1 to the mounting plate 12 of the enclosure 10.

It is to be understood, however, that even though numerous characteristics and advantages of the embodiments have been set forth in the foregoing description, together with details of the structure and function of the embodiments, the present disclosure is illustrative only, and changes may be made in details, especially in matters of shape, size, and arrangement of parts within the principles of the embodiments to the full extent indicated by the broad general meaning of the terms in which the appended claims are expressed.

The invention claimed is:

1. A mounting device for a fan, comprising:
   a first mounting frame; and
   a second mounting frame adjustably mounted to the first mounting frame according to the height of a fan, to sandwich the fan between the first and second mounting frames;
   wherein the first and second mounting frames each comprise a base plate and two first lateral plates extending from two opposite sides of the base plate, two tabs extend from a first and a second ends of each first lateral plate, the tabs of the first mounting frame are adjustably attached to the first lateral plates of the second mounting frame, and the tabs of the second mounting frame are adjustably attached to the first lateral plates of the first mounting frame.

2. The mounting device of claim 1, wherein the first and second ends of each first lateral plate define a plurality of latching slots, a protrusion extends from each tab, the protrusions of the first and second ends of the first mounting frame are correspondingly positioned at inner and outer sides of the first mounting frame to be adjustably latched in the latching slots of the second mounting frame, the protrusions of the first and second ends of the second mounting frame are correspondingly positioned at outer and inner sides of the second mounting frame to be adjustably latched in the latching slots of the first mounting frame.

3. The mounting device of claim 2, wherein the inner side of the first end and the outer side of the second end of each first lateral plate of the first mounting frame each define a first receiving space to correspondingly receive the tab of a corresponding one of the first and seconds of the first lateral plate of the second mounting frame, and the outer side of the first end and the inner side of the second end of each first lateral plate of the second mounting frame each define a second receiving space to correspondingly receive the tab of a corresponding one of the first and seconds of the first lateral plate of the first mounting frame.

4. The mounting device of claim 1, wherein four mounting posts extend from four corners of an inner surface of each base plate, the fan defines four mounting holes in four corners of each of opposite sides of the fan, for receiving the mounting posts.

5. The mounting device of claim 4, further comprising eight elastic pads wherein each pad is triangular and defines a through hole for the corresponding mounting post extending through, the pads are attached to the four corners of each base plate to resist against the fan.

6. A fan module comprising:
   a fan;
   a first mounting frame; and
   a second mounting frame adjustably mounted to the first mounting frame according to the height of a fan, to sandwich the fan between the first and second mounting frames;
   wherein the first and second mounting frames each comprise a base plate and two first lateral plates extending from two opposite sides of the base plate, two tabs extend from a first and a second ends of each lateral plate, the tabs of the first mounting frame are adjustably attached to the first lateral plates of the second mounting frame, and the tabs of the second mounting frame are adjustably attached to the first lateral plates of the first mounting frame.

7. The fan module of claim 6, wherein the first and second ends of each first lateral plate define a plurality of latching slots, a protrusion extends from each tab, the protrusions of the first and second ends of the first mounting frame are correspondingly positioned at inner and outer sides of the first mounting frame to be adjustably latched in the latching slots of the second mounting frame, the protrusions of the first and second ends of the second mounting frame are correspondingly positioned at outer and inner sides of the second mounting frame to be adjustably latched in the latching slots of the first mounting frame.

8. The fan module of claim 7, wherein the inner side of the first end and the outer side of the second end of each first lateral plate of the first mounting frame each define a first receiving space to correspondingly receive the tab of a corresponding one of the first and seconds of the first lateral plate of the second mounting frame, and the outer side of the first end and the inner side of the second end of each first lateral plate of the second mounting frame each define a second receiving space to correspondingly receive the tab of a corresponding one of the first and seconds of the first lateral plate of the first mounting frame.

9. The fan module of claim 6, wherein four mounting posts extend from four corners of an inner surface of each base plate, the fan defines four mounting holes in four corners of each of opposite sides of the fan, for receiving the mounting posts.

10. The fan module of claim 9, further comprising eight elastic pads, wherein each pad is triangular and defines a through hole for the corresponding post extending through, the pads are fixed on the corners of the base plates to resist against the fan.

* * * * *